US012587218B2

(12) United States Patent
Shin et al.

(10) Patent No.: US 12,587,218 B2
(45) Date of Patent: Mar. 24, 2026

(54) WIRELESS RECEIVER CIRCUITRY WITH LOCAL FEEDBACK PROTECTION

(71) Applicant: Apple Inc., Cupertino, CA (US)

(72) Inventors: Woorim Shin, Palo Alto, CA (US); Morteza Nick, San Diego, CA (US); David M Signoff, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 539 days.

(21) Appl. No.: 18/158,364

(22) Filed: Jan. 23, 2023

(65) Prior Publication Data

US 2024/0250705 A1 Jul. 25, 2024

(51) Int. Cl.
*H04B 1/04* (2006.01)
*H04B 1/16* (2006.01)

(52) U.S. Cl.
CPC ............. *H04B 1/0458* (2013.01); *H04B 1/16* (2013.01); *H04B 2001/0408* (2013.01)

(58) Field of Classification Search
CPC .................... H04B 1/0458; H04B 1/16; H04B 2001/0408; H04B 1/123; H04B 1/525
See application file for complete search history.

(56) References Cited

U.S. PATENT DOCUMENTS

| | | | |
|---|---|---|---|
| 8,078,123 B2 | 12/2011 | Behzad et al. | |
| 8,195,117 B2 | 6/2012 | Bult et al. | |
| 8,417,286 B2 | 4/2013 | Gorbachov et al. | |
| 9,503,107 B1 * | 11/2016 | Kim ........................ | H03L 7/099 |
| 10,629,553 B2 | 4/2020 | Soliman et al. | |
| 10,693,231 B2 | 6/2020 | Dunworth et al. | |
| 10,938,396 B2 | 3/2021 | Agrawal et al. | |
| 2011/0176623 A1 * | 7/2011 | Shinsuke ............. | H01Q 3/2605 |
| | | | 375/260 |
| 2022/0322374 A1 | 10/2022 | Gopal et al. | |

* cited by examiner

*Primary Examiner* — Ayodeji O Ayotunde
(74) *Attorney, Agent, or Firm* — Treyz Law Group; Jason Tsai

(57) ABSTRACT

Wireless circuitry can have an antenna coupled to a receiving amplifier. The receiving amplifier may be coupled to a local feedback loop configured to reduce the gain of the receiving amplifier for suppressing the signal power when receiving a large input signal. The local feedback loop can include a detector and a feedback controller. The detector may have an input coupled to the receiving amplifier and can output a detected signal. The feedback controller may receive the detected signal and output a corresponding control signal. The control signal can be used to reduce the gain of the receiving amplifier by adjusting one or more components within or coupled to the receiving amplifier. Suppressing large input signals in this way presents no additional parasitic loading to the downlink path and can thus provide overvoltage protection without degrading receiver performance.

20 Claims, 6 Drawing Sheets

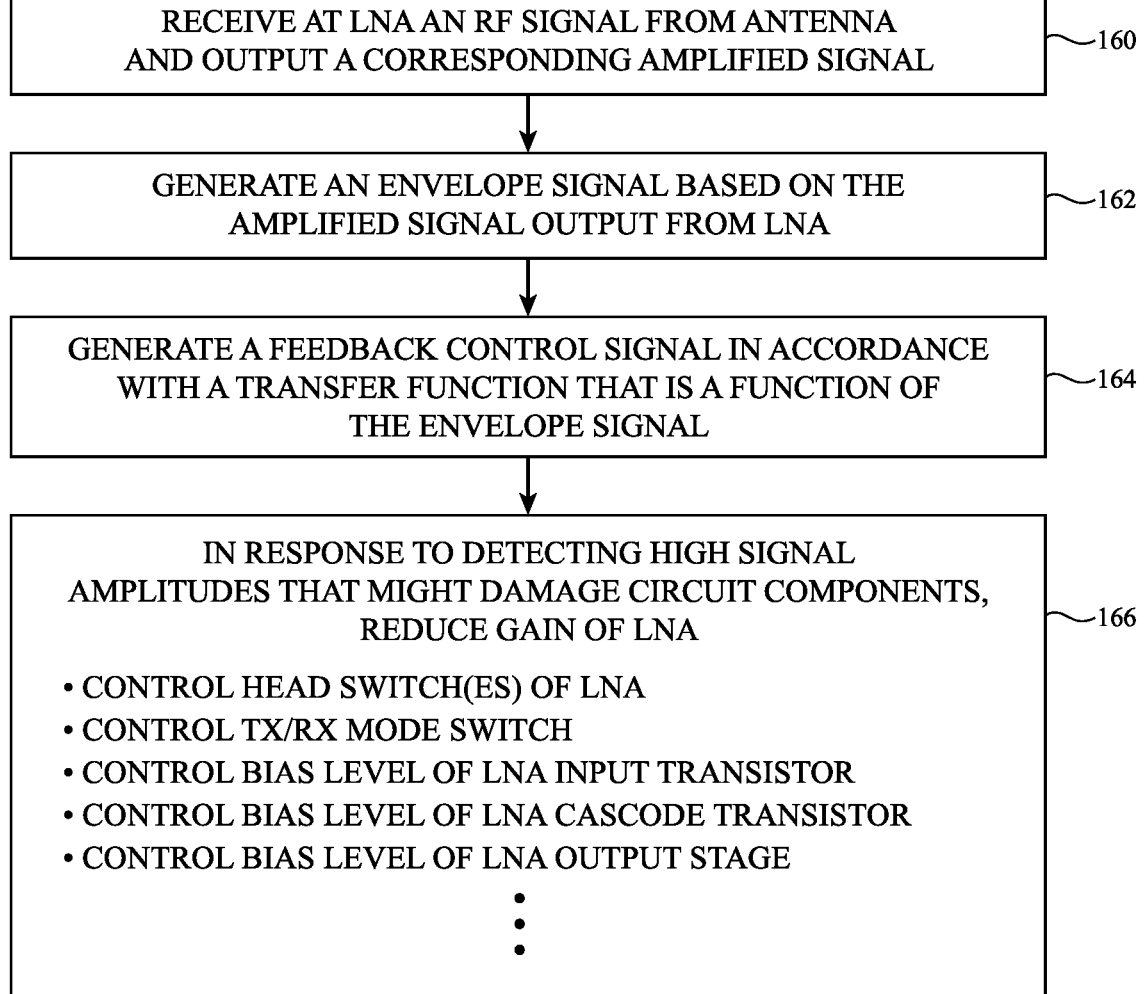

RECEIVE AT LNA AN RF SIGNAL FROM ANTENNA
AND OUTPUT A CORRESPONDING AMPLIFIED SIGNAL ~160

GENERATE AN ENVELOPE SIGNAL BASED ON THE
AMPLIFIED SIGNAL OUTPUT FROM LNA ~162

GENERATE A FEEDBACK CONTROL SIGNAL IN ACCORDANCE
WITH A TRANSFER FUNCTION THAT IS A FUNCTION OF
THE ENVELOPE SIGNAL ~164

IN RESPONSE TO DETECTING HIGH SIGNAL
AMPLITUDES THAT MIGHT DAMAGE CIRCUIT COMPONENTS,
REDUCE GAIN OF LNA ~166

• CONTROL HEAD SWITCH(ES) OF LNA
• CONTROL TX/RX MODE SWITCH
• CONTROL BIAS LEVEL OF LNA INPUT TRANSISTOR
• CONTROL BIAS LEVEL OF LNA CASCODE TRANSISTOR
• CONTROL BIAS LEVEL OF LNA OUTPUT STAGE

*FIG. 6*

WIRELESS RECEIVER CIRCUITRY WITH LOCAL FEEDBACK PROTECTION

FIELD

This disclosure relates generally to electronic devices and, more particularly, to electronic devices with wireless communications circuitry.

BACKGROUND

Electronic devices can be provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

Radio-frequency signals transmitted by an antenna can be fed through a power amplifier, which is configured to amplify low power analog signals to higher power signals more suitable for transmission through the air over long distances. Radio-frequency signals received at an antenna can be fed through a low noise amplifier, which is configured to amplify low power analog signals to higher power signals for ease of processing at a receiver. It can be challenging to design a satisfactory low noise amplifier for an electronic device.

SUMMARY

An electronic device may include wireless communications circuitry. The wireless communications circuitry may include one or more processors or signal processing blocks for generating baseband signals, a transceiver for upconverting (modulating) the baseband signals to radio frequencies and for downconverting (demodulating) radio-frequency signals to baseband signals, a radio-frequency power amplifier for amplifying radio-frequency signals prior to transmission at one or more antennas, and a radio-frequency low noise amplifier for amplifying radio-frequency signals received at one or more antennas in the electronic device.

An aspect of the disclosure provides wireless circuitry that includes an amplifier configured to receive a radio-frequency signal from one or more antennas, a detection circuit configured to receive signals from the amplifier and configured to output a corresponding detected signal, and a feedback control circuit configured to receive the detected signal from the detection circuit and configured to output a corresponding control signal for adjusting one or more components in the wireless circuitry. The detection circuit can be an envelope detector, a radio-frequency power detector, or an amplitude detector. The feedback control circuit can be a differential-to-single-ended amplifier having an adjustable offset and/or exhibiting a transfer function with an adjustable slope. The control signal can adjust one or more power supply switches in the amplifier, adjust a mode switch coupled to an input of the amplifier, adjust one or more bias levels in the amplifier, adjust a bias level of a transformer coil disposed between two amplifier stages of the amplifier.

An aspect of the disclosure provides a method that includes using an amplifier to receive a radio-frequency signal from one or more antennas, generating an envelope signal based on the radio-frequency signal received at the amplifier, and reducing a gain of the amplifier in response to detecting that the envelope signal exceeds a threshold level. The method can further include using a feedback controller to receive the envelope signal and to generate a corresponding control signal for reducing the gain of the amplifier. The method can include reducing the gain of the amplifier by adjusting one or more power supply switches of the amplifier in accordance with an amplifier transfer function with an adjustable slope or offset, adjusting a transmit-receive mode switch in accordance with an amplifier transfer function with an adjustable slope or offset, and/or adjusting one or more bias levels of the amplifier in accordance with the amplifier transfer function.

An aspect of the disclosure provides wireless circuitry that includes: an amplifier having at least a first amplifier stage and a second amplifier stage, an input coupled to one or more antennas, and an output coupled to one or more processors; a transmit-receive mode switch coupled to the input of the amplifier; a detector having an input coupled to the second amplifier stage and configured to generate a detected signal; and a feedback controller configured to receive the detected signal and to generate a corresponding control signal. The control signal can be used to adjust at least one of a first power supply switch in the first amplifier stage, a second power supply switch in the second amplifier stage, a bias level of an input transistor in the first amplifier stage, a bias level of a cascode transistor coupled in series with the input transistor in the first amplifier stage, and a bias level of a coil coupled between the first and second amplifier stages.

BRIEF DESCRIPTION OF THE DRAWINGS

FIG. 6 is a flow chart of illustrative steps for operating the wireless receiving circuitry of the type shown in FIGS. 3 and 4 in accordance with some embodiments.

DETAILED DESCRIPTION

Figure 1:
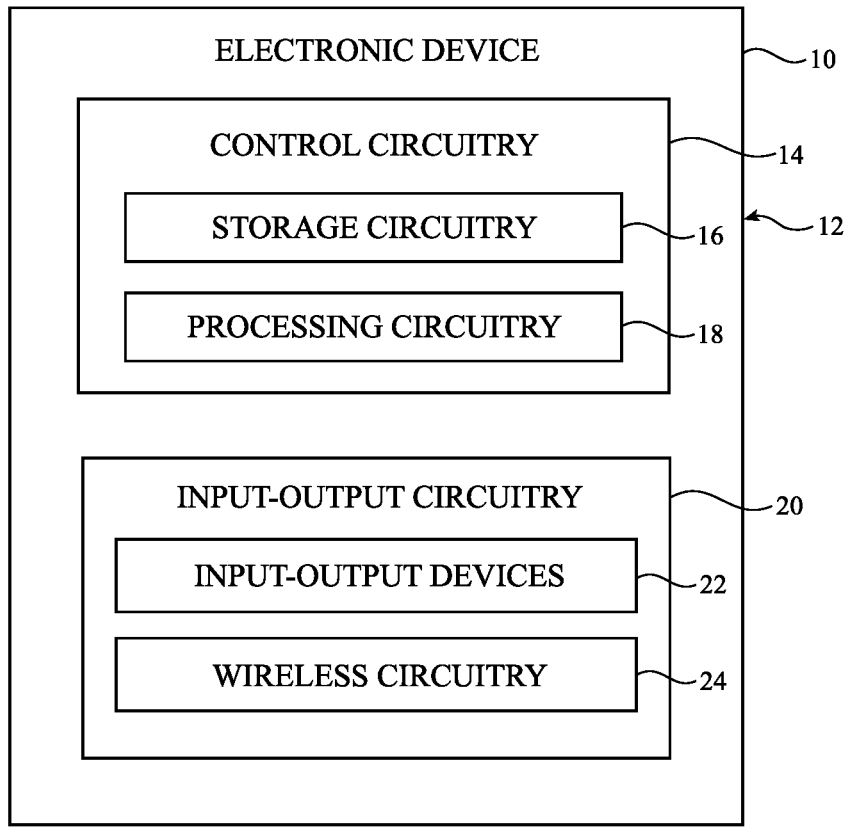
FIG. 1 is a diagram of an illustrative electronic device having wireless circuitry in accordance with some embodiments.

An electronic device such as device 10 of FIG. 1 may be provided with wireless circuitry. The wireless circuitry may include low noise amplifier (LNA) circuitry configured to amplify a radio-frequency signal received via one or more antennas. A transmit/receive mode switch can be coupled to an input of the LNA circuitry. The mode switch can be turned on during a transmit mode and can be turned off during a receive mode. The LNA circuitry can have one or more head switches for controlling the amount of power supply voltage that is provided to the LNA circuitry. An envelope detector can be coupled to an output of the LNA circuitry and can be configured to generate a corresponding envelope signal.

The LNA circuitry can be coupled to a feedback control circuit that receives the envelope signal from the envelope detector and that outputs a corresponding control signal to control one or more portions of the LNA circuitry. The feedback control circuit can be implemented as a differential-to-single-ended amplifier circuit, a comparator, or other amplifier. The feedback control circuit can exhibit a transfer function with a tunable offset and a tunable slope. The control signal can be at a constant low level when the envelope signal exhibits small or nominal levels and can ramp up as the envelope signal approaches higher levels that could potentially damage the internal components of the wireless receiver circuitry. The control signal output from the feedback control circuit can be used to quickly mitigate any potential overstress of the receiver components by tuning the head switches of the LNA circuitry, activating and deactivating the transmit/receive mode switch, and/or adjusting one or more bias voltages within the LNA circuitry. Configured and operated in this way, the feedback control circuit can provide fast protection response time to extend the lifetime of wireless receiver circuitry in device 10 without degrading receiver performance.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed from plastic, glass, ceramics, fiber composites, metal (e.g., stainless steel, aluminum, metal alloys, etc.), other suitable materials, or a combination of these materials. In some embodiments, parts or all of housing 12 may be formed from dielectric or other low-conductivity material (e.g., glass, ceramic, plastic, sapphire, etc.). In other embodiments, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using the antenna(s).

Wireless circuitry 24 may transmit and/or receive radio-frequency signals within a corresponding frequency band at radio frequencies (sometimes referred to herein as a communications band or simply as a "band"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Figure 2:
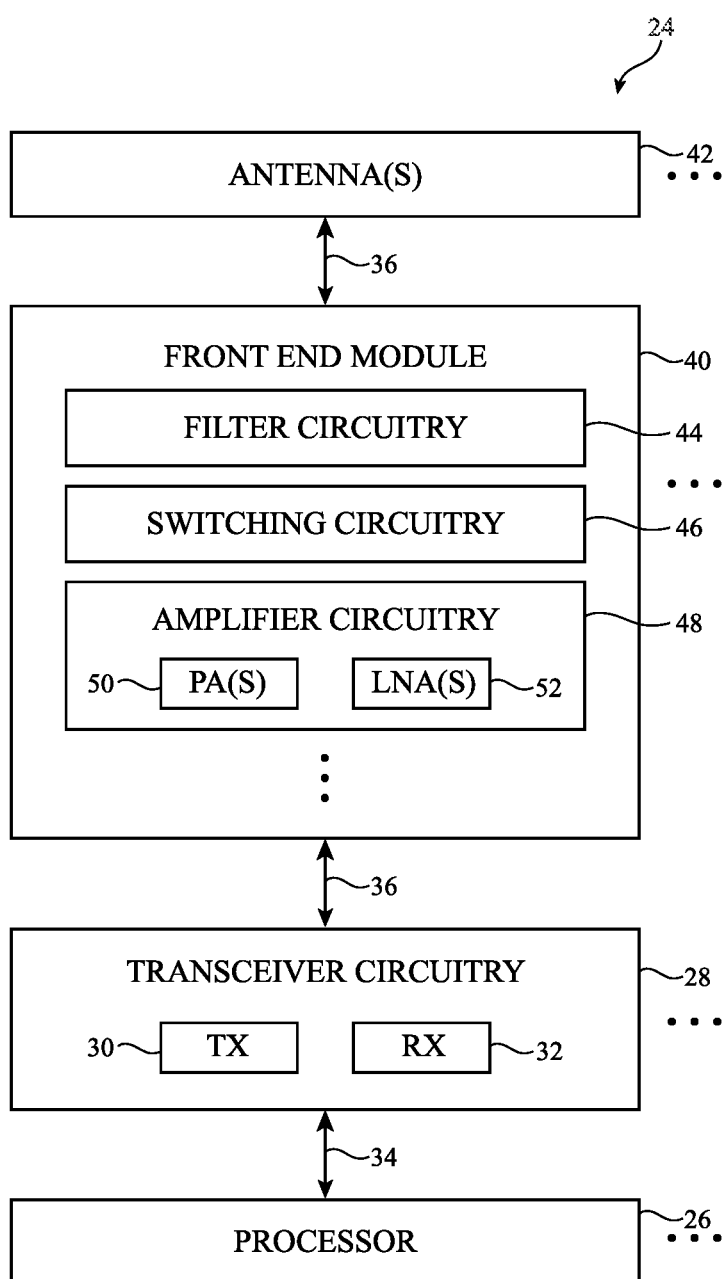
FIG. 2 is a diagram of illustrative wireless circuitry having radio-frequency amplifiers in accordance with some embodiments.

FIG. 2 is a diagram showing illustrative components within wireless circuitry 24. As shown in FIG. 2, wireless circuitry 24 may include a processor such as processor 26, radio-frequency (RF) transceiver circuitry such as radio-frequency transceiver 28, radio-frequency front end circuitry such as radio-frequency front end module (FEM) 40, and antenna(s) 42. Processor 26 may be a baseband processor, application processor, general purpose processor, microprocessor, microcontroller, digital signal processor, host processor, application specific signal processing hardware, or other type of processor. Processor 26 may be coupled to transceiver 28 over path 34. Transceiver 28 may be coupled to antenna 42 via radio-frequency transmission line path 36. Radio-frequency front end module 40 may be disposed on radio-frequency transmission line path 36 between transceiver 28 and antenna 42.

In the example of FIG. 2, wireless circuitry 24 is illustrated as including only a single processor 26, a single transceiver 28, a single front end module 40, and a single antenna 42 for the sake of clarity. In general, wireless circuitry 24 may include any desired number of processors 26, any desired number of transceivers 28, any desired number of front end modules 40, and any desired number of antennas 42. Each processor 26 may be coupled to one or more transceiver 28 over respective paths 34. Each transceiver 28 may include a transmitter circuit 30 configured to output uplink signals to antenna 42, may include a receiver circuit 32 configured to receive downlink signals from antenna 42, and may be coupled to one or more antennas 42 over respective radio-frequency transmission line paths 36. Each radio-frequency transmission line path 36 may have a respective front end module 40 disposed thereon. If desired, two or more front end modules 40 may be disposed on the same radio-frequency transmission line path 36. If desired, one or more of the radio-frequency transmission line paths

36 in wireless circuitry 24 may be implemented without any front end module disposed thereon.

Radio-frequency transmission line path 36 may be coupled to an antenna feed on antenna 42. The antenna feed may, for example, include a positive antenna feed terminal and a ground antenna feed terminal. Radio-frequency transmission line path 36 may have a positive transmission line signal path such that is coupled to the positive antenna feed terminal on antenna 42. Radio-frequency transmission line path 36 may have a ground transmission line signal path that is coupled to the ground antenna feed terminal on antenna 42. This example is merely illustrative and, in general, antennas 42 may be fed using any desired antenna feeding scheme. If desired, antenna 42 may have multiple antenna feeds that are coupled to one or more radio-frequency transmission line paths 36.

Radio-frequency transmission line path 36 may include transmission lines that are used to route radio-frequency antenna signals within device 10 (FIG. 1). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 36 may be integrated into rigid and/or flexible printed circuit boards.

In performing wireless transmission, processor 26 may provide transmit signals (e.g., digital or baseband signals) to transceiver 28 over path 34. Transceiver 28 may further include circuitry for converting the transmit (baseband) signals received from processor 26 into corresponding radio-frequency signals. For example, transceiver circuitry 28 may include mixer circuitry for up-converting (or modulating) the transmit (baseband) signals to radio frequencies prior to transmission over antenna 42. The example of FIG. 2 in which processor 26 communicates with transceiver 28 is merely illustrative. In general, transceiver 28 may communicate with a baseband processor, an application processor, general purpose processor, a microcontroller, a microprocessor, or one or more processors within circuitry 18. Transceiver circuitry 28 may also include digital-to-analog converter (DAC) and/or analog-to-digital converter (ADC) circuitry for converting signals between digital and analog domains. Transceiver 28 may use transmitter (TX) 30 to transmit the radio-frequency signals over antenna 42 via radio-frequency transmission line path 36 and front end module 40. Antenna 42 may transmit the radio-frequency signals to external wireless equipment by radiating the radio-frequency signals into free space.

In performing wireless reception, antenna 42 may receive radio-frequency signals from the external wireless equipment. The received radio-frequency signals may be conveyed to transceiver 28 via radio-frequency transmission line path 36 and front end module 40. Transceiver 28 may include circuitry such as receiver (RX) 32 for receiving signals from front end module 40 and for converting the received radio-frequency signals into corresponding baseband signals. For example, transceiver 28 may include mixer circuitry for down-converting (or demodulating) the received radio-frequency signals to baseband frequencies prior to conveying the received signals to processor 26 over path 34.

Front end module (FEM) 40 may include radio-frequency front end circuitry that operates on the radio-frequency signals conveyed (transmitted and/or received) over radio-frequency transmission line path 36. FEM 40 may, for example, include front end module (FEM) components such as radio-frequency filter circuitry 44 (e.g., low pass filters, high pass filters, notch filters, band pass filters, multiplexing circuitry, duplexer circuitry, diplexer circuitry, triplexer circuitry, etc.), switching circuitry 46 (e.g., one or more radio-frequency switches), radio-frequency amplifier circuitry 48 (e.g., one or more power amplifier circuits 50 and/or one or more low-noise amplifier circuits 52), impedance matching circuitry (e.g., circuitry that helps to match the impedance of antenna 42 to the impedance of radio-frequency transmission line 36), antenna tuning circuitry (e.g., networks of capacitors, resistors, inductors, and/or switches that adjust the frequency response of antenna 42), radio-frequency coupler circuitry, charge pump circuitry, power management circuitry, digital control and interface circuitry, and/or any other desired circuitry that operates on the radio-frequency signals transmitted and/or received by antenna 42. Each of the front end module components may be mounted to a common (shared) substrate such as a rigid printed circuit board substrate or flexible printed circuit substrate. If desired, the various front end module components may also be integrated into a single integrated circuit chip. If desired, amplifier circuitry 48 and/or other components in front end 40 such as filter circuitry 44 may also be implemented as part of transceiver circuitry 28.

Filter circuitry 44, switching circuitry 46, amplifier circuitry 48, and other circuitry may be disposed along radio-frequency transmission line path 36, may be incorporated into FEM 40, and/or may be incorporated into antenna 42 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna 42 over time.

Transceiver 28 may be separate from front end module 40. For example, transceiver 28 may be formed on another substrate such as the main logic board of device 10, a rigid printed circuit board, or flexible printed circuit that is not a part of front end module 40. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, processor 26 and/or portions of transceiver 28 (e.g., a host processor on transceiver 28) may form a part of control circuitry 14. Control circuitry 14 (e.g., portions of control circuitry 14 formed on processor 26, portions of control circuitry 14 formed on transceiver 28, and/or portions of control circuitry 14 that are separate from wireless circuitry 24) may provide control signals (e.g., over one or more control paths in device 10) that control the operation of front end module 40.

Transceiver circuitry 28 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network transceiver circuitry that handles the 2.4 GHz Bluetooth® band or other WPAN communications bands, cellular telephone transceiver circuitry that handles cellular telephone bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), near-field communications (NFC) transceiver circuitry that handles near-field communications bands (e.g., at 13.56 MHz), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired communications bands of interest.

Wireless circuitry 24 may include one or more antennas such as antenna 42. Antenna 42 may be formed using any desired antenna structures. For example, antenna 42 may be an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc. Two or more antennas 42 may be arranged into one or more phased antenna arrays (e.g., for conveying radio-frequency signals at millimeter wave frequencies). Parasitic elements may be included in antenna 42 to adjust antenna performance. Antenna 42 may be provided with a conductive cavity that backs the antenna resonating element of antenna 42 (e.g., antenna 42 may be a cavity-backed antenna such as a cavity-backed slot antenna).

Figure 3:
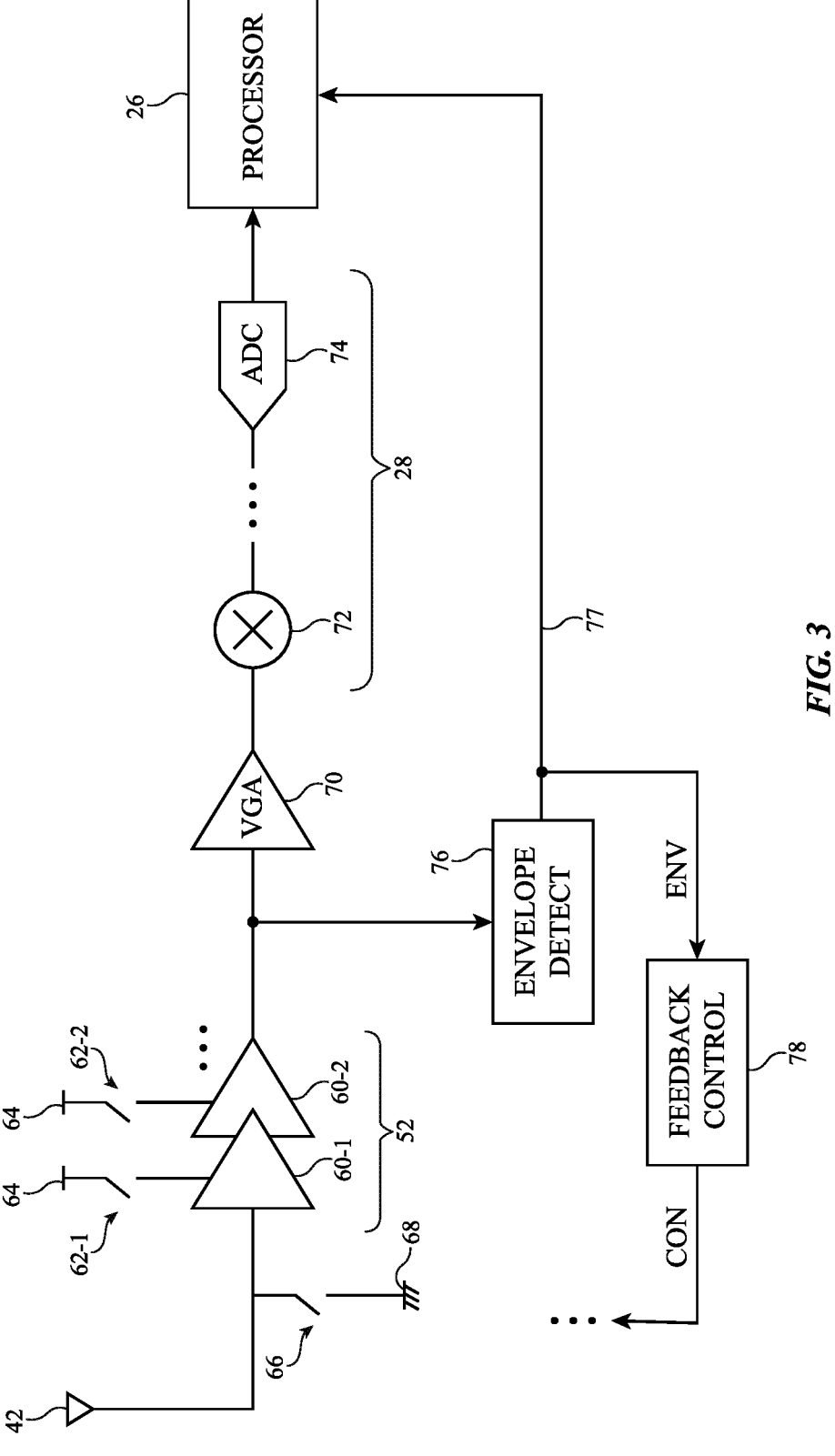
FIG. 3 is a diagram of illustrative wireless receiver circuitry with a local gain reduction feedback loop in accordance with some embodiments.

FIG. 3 is a diagram of illustrative wireless circuitry 24 having one or more antenna(s) 42 that is coupled to radio-frequency low noise amplifier (LNA) circuitry 52. Antenna 42 can also be coupled to radio-frequency power amplifier circuitry (see, e.g., amplifier circuitry 50 of FIG. 2). Power amplifier circuitry configured to amplify radio-frequency signals for transmission at antenna 42 is sometimes referred to as a transmitting amplifier or a radio-frequency (RF) signal transmission amplifier circuit. Conversely, amplifier 52 configured to amplify radio-frequency signals received by antenna 42 is sometimes referred to as a receiving amplifier or a radio-frequency (RF) signal reception amplifier circuit.

Wireless circuitry 24 may be operable in a transmit (TX) mode and a receive (RX) mode. Antenna 42 may be coupled to a mode switching component such as a transmit-receive mode switch 66. Transmit-receive mode switch 66 may be shunted to a ground power supply line 68, sometimes referred to as a ground line or ground. When wireless circuitry 24 is operated in the transmit mode, mode switch 66 and the transmitting amplifier circuitry may be active (enabled or switched into use) while receiving amplifier circuitry 52 may be idle (deactivated or switched out of use). When wireless circuitry 24 is operated in the receive mode, receiving amplifier 52 may be active (enabled or switched into use) while the transmitting amplifier circuitry may be idle (disabled or switched out of use) and while mode switch 66 is turned off. In other words, mode switch 66 can be used to selectively disable the radio-frequency receiving circuitry by grounding the receive (downlink) path.

Receiving amplifier circuitry 52 can include one or more low noise amplifiers stages. In the example of FIG. 3, amplifier 52 may include at least a first amplifier stage 60-1 and a second amplifier stage 60-2. First amplifier stage 60-1 can receive a first positive power supply voltage from power supply line 64 via a first power supply switch 62-1, whereas second amplifier stage 60-2 can receive a second positive power supply voltage from power supply line 64 via a second power supply switch 62-2. Power supply switch 62-1 can be completely turned off to shut down (disable) the first amplifier stage 60-1 or can be partially turned on to limit the gain of the first amplifier stage 60-1. Similarly, power supply switch 62-2 can be completely turned off to shut down (disable) the second amplifier stage 60-2 or can be partially turned on to limit the gain of the second amplifier stage 60-2. Power supply switches 62-1 and 62-2 that are used to shut off or reduce the gain of the different amplifier stages are sometimes referred to as amplifier head switches. The example of FIG. 3 in which low noise amplifier circuitry 52 includes two amplifier stages is illustrative. In other embodiments, receiving amplifier circuitry 52 can include three or more amplifier stages, four or more amplifier stages, five or more amplifier stages, 5-10 amplifier stages, or more than 10 amplifier stages each having a respective head switch 62.

LNA amplifier circuitry 52 can be coupled to another downstream radio-frequency amplifier such as a variable gain amplifier 70. Compared to LNA amplifier circuitry 52, which is coupled closer to antenna 42, variable gain amplifier 70 exhibits relatively higher noise levels and is therefore not considered a "low noise" amplifier. Variable gain amplifier 70 may have an output that is coupled to a downconversion mixer 72. Mixer 72 may receive signals from variable gain amplifier 70 and may use a local oscillator signal to downconvert (or demodulate) the radio-frequency signals to baseband (or intermediate) frequencies. A data converter such as analog-to-digital converter (ADC) circuit 74 can then convert the downconverted signals from the analog domain to the digital domain to generate corresponding digital baseband signals. Mixer 72 and ADC circuit 74 may sometimes be considered part of transceiver circuitry 28. The digital baseband signals can then be received by one or more processors 26. Processor 26 may represent one or more processors such as a baseband processor, an application processor, a digital signal processor, a microcontroller, a microprocessor, a central processing unit (CPU), a programmable device, a combination of these circuits, and/or one or more processors within circuitry 18 (see FIG. 1).

The circuitry described above for processing signals received by antenna 42 is sometimes referred to collectively as wireless receiving circuitry. If desired, one or more additional front end module components such as radio-frequency filter circuitry 44 of FIG. 2 (e.g., low pass filters, high pass filters, notch filters, band pass filters, multiplexing circuitry, duplexer circuitry, diplexer circuitry, triplexer circuitry, etc.), switching circuitry 46 (e.g., one or more radio-frequency switches), impedance matching circuitry, antenna tuning circuitry (e.g., networks of capacitors, resistors, inductors, and/or switches that adjust the frequency response of antenna 42), radio-frequency coupler circuitry, charge pump circuitry, power management circuitry, and/or any other desired front-end module circuitry can optionally be coupled at the input and/or output of LNA circuitry 52 along the radio-frequency reception line path.

In practice, uncoordinated radio-frequency signals or blocker signals with high input power levels can be presented at the input of a low noise amplifier. High power input signals typically exhibit large signal swings. These large signals can be repeatedly amplified as they propagate through the various amplifier stages in the radio-frequency receive path. If care is not taken, the large (amplified) signal swings can result in permanent damage to the various components in the wireless receiving circuitry. The baseband processor can sometimes include an automatic gain control (AGC) circuit that monitors the received digital baseband signals and that generates corresponding control signals for reducing the receiver gain. Conventional automatic gain control mechanisms, however, can exhibit prohibitively slow response times and is sometimes insufficient to protect components in the receive path when very high input power signals are present. Other conventional solutions involve placing electrostatic discharge (ESD) diodes at various locations along the receive path. Adding ESD protection diodes, however, can introduce a significant amount of parasitic capacitance and resistance that degrade the overall wireless receiver performance.

In accordance with an embodiment, the wireless receiver circuitry of FIG. 3 can be provided with a local feedback loop configured to prevent or protect the receiver components from being damaged when antenna 42 receives high power input signals (e.g., input signals with large voltage or current swings). As shown in FIG. 3, wireless circuitry 24 can further include an envelope detection circuit 76 such as envelope detector 76 and a feedback control circuit such as feedback controller 78 connected in a local feedback loop with receiving amplifier circuitry 52. The local feedback loop operates in the analog domain and is therefore sometimes referred to as an analog feedback loop. Envelope detection circuit 76 can have an input coupled to the output of receiving amplifier circuitry 52 and can be configured to monitor the incoming power level (e.g., to sense the signal strength at the output of LNA circuitry 52 for blocker detection and power saturation prevention). Envelope detection circuit 76 can output a corresponding envelope signal ENV. Envelope signal ENV can be provided to processor 26 via path 77 for performing automatic gain control or other digital signal processing. When a high power radio-frequency input signal is present, envelope signal ENV will exhibit a higher voltage output. Conversely, when a low power radio-frequency input signal is present, envelope signal ENV will exhibit a lower voltage output.

The use of an envelope detector 76 in the local feedback loop is merely illustrative. In other embodiments, detector 76 can be a radio-frequency power detector, a signal amplitude detector, or other types of detection circuit. In general, detection circuit 76 can output a detected signal to the local feedback control circuit 78. Device configurations in which detection circuit 76 is an envelope detector is sometimes described as an example herein.

Feedback control circuit 78 can receive the envelope signal ENV and output a corresponding control signal CON for controlling one or more portions of receiving (LNA) amplifier circuitry 52. Feedback control circuit 78 can be configured to reduce the gain of amplifier circuitry 52 in response to detecting signal ENV with a high voltage so that the signal strength at the output of amplifier circuitry 52 is reduced to a sufficiently low level (e.g., to reduce the gain of amplifier circuitry 52 in response to detecting that the envelope signal exceeds a threshold level). Forming a feedback loop locally at amplifier circuitry 52 in this way can be beneficial and technically advantageous by providing a faster response time than the digital AGC mechanism and can help extend the lifetime of wireless circuitry 24.

This feedback loop that includes envelope detector 76 and feedback controller 78 coupled to LNA amplifier circuitry 52 is therefore sometimes referred to herein as a local feedback amplifier gain control (reduction) loop. As examples, feedback controller 78 can be used to selectively reduce the gain of amplifier circuitry 52 without adding any parasitic elements to the receiving signal path by adjusting one or more amplifier head switches 62, by selectively activating and deactivating transmit-receiving mode switch 66, by controlling one or more bias voltages within circuitry 52, by performing a combination of these techniques, and/or by making other dynamic adjustments associated with circuitry 52. Circuitry in this feedback control loop for preventing damage when high power input signals are present is sometimes referred to as over-voltage protection (OVP) circuitry.

Figure 4:
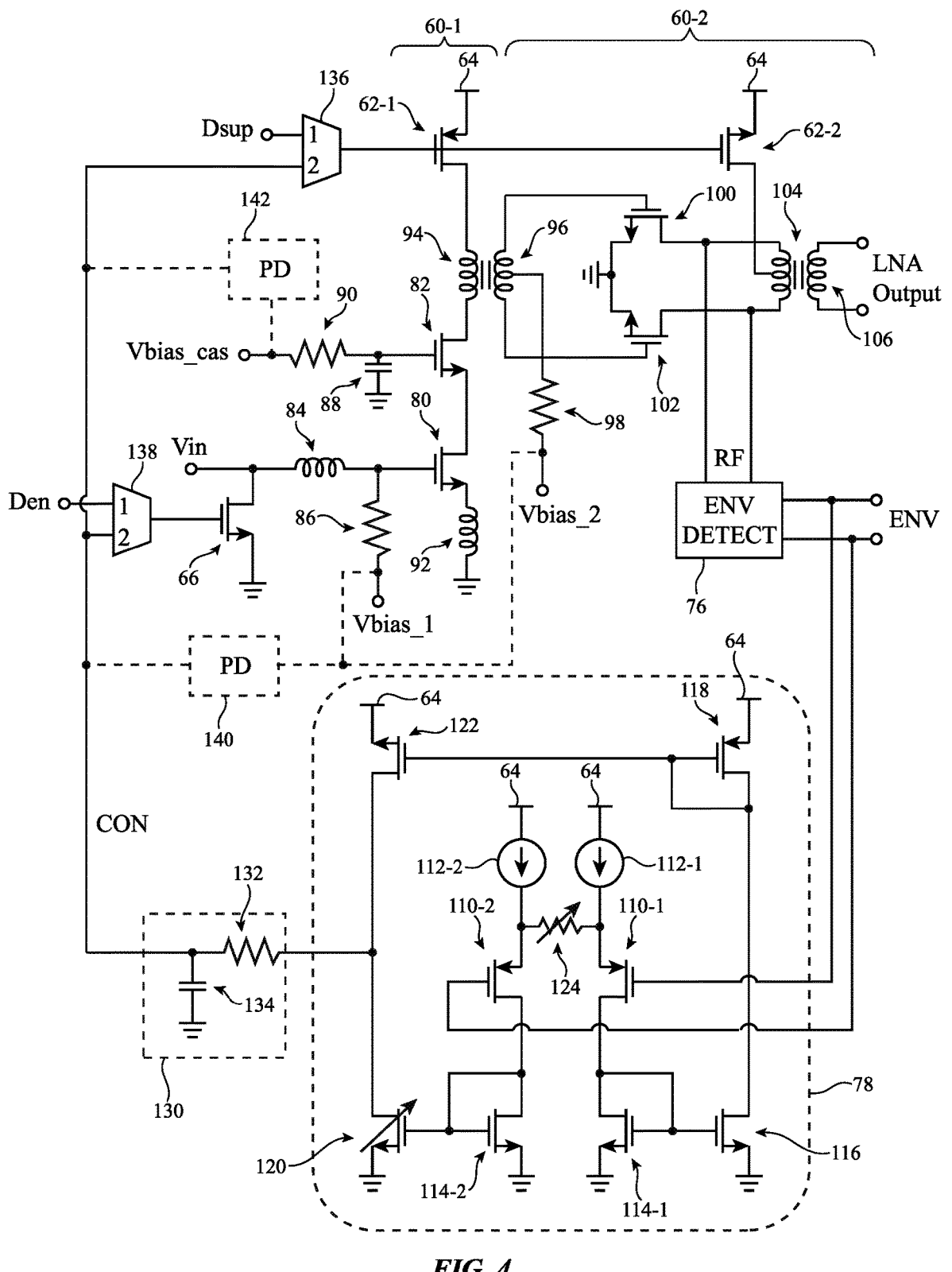
FIG. 4 is a circuit diagram of an illustrative radio-frequency receiving amplifier and associated over-voltage protection circuitry in accordance with some embodiments.

FIG. 4 is a circuit diagram of wireless receiving circuitry and associated over-voltage protection circuitry. As shown in FIG. 4, the LNA circuitry can include first amplifier stage 60-1 coupled in series with second amplifier stage 60-2. First amplifier stage 60-1 can include an input transistor 80 (e.g., a n-type metal-oxide-semiconductor or NMOS transistor), a cascode transistor 82 (e.g., an NMOS transistor), inductors such as inductors 92 and 94, and a first power supply switch 62-1 (e.g., a p-type metal-oxide-semiconductor or PMOS transistor).

Input transistor 80 may have a gate terminal configured to receive a radio-frequency input signal Vin via series input inductor 84, a drain terminal, and a source terminal that is coupled to ground via inductor 92. The terms "source" and "drain" terminals used to refer to current-conveying terminals in a transistor may be used interchangeably and are sometimes referred to as "source-drain" terminals. Thus, the source terminal of transistor 80 can be referred to as a first source-drain terminal, and the drain terminal of transistor 80 can be referred to as a second source-drain terminal (or vice versa). Inductor 92 that is coupled to the source terminal of input transistor 80 is sometimes referred to as a source degeneration inductor or a degeneration inductor.

Cascode transistor 82 may have a source terminal coupled to the drain terminal of input transistor 80, a gate terminal configured to receive a cascode bias voltage Vbias_cas via series resistor 90, and a drain terminal coupled to inductor 94. A "cascode" transistor can refer to or be defined herein as a transistor having a first source-drain terminal coupled to the input transistor, a second source-drain terminal coupled to an amplifier output port, and a gate terminal coupled to a common (fixed) voltage source (e.g., Vcascode). The cascode transistor 82 may be used to increase the output impedance and the input-output isolation of amplifier stage 60-1. The gate terminal of cascode transistor 82 may also be coupled to a shunt capacitor 88. Inductor 94 has a first terminal coupled to the drain terminal of cascode transistor 82 and has a second terminal coupled to the first power supply transistor 62-1. Inductor 94 is sometimes referred to as an output inductor or coil. Power supply (head) transistor 62-1 may have a drain terminal coupled to inductor 94, a gate terminal, and a source terminal that is coupled to positive power supply line 64. The example of FIG. 4 in which the first amplifier stage 60-1 has a single-ended input is illustrative. In other embodiments, the first amplifier stage 60-1 of the wireless receiving amplifier (LNA) circuitry can have a differential input port for receiving radio-frequency signals.

First amplifier stage 60-1 may be coupled to second amplifier stage 60-2 via a transformer that includes inductor 94 serving as the primary winding (coil) and inductor 96 serving as the secondary winding (coil). This transformer that includes coils 94 and 96 is said to be coupled between the first amplifier stage 60-1 and the second amplifier stage 60-2. Secondary coil 96 can have a first terminal coupled to a first input transistor 100 of second amplifier 60-2, a second terminal coupled to a second input transistor 102 of second amplifier 60-2, and a center (tap) terminal coupled to series resistor 98. Input transistor 100 may have a source terminal coupled to ground, a gate terminal coupled to the first terminal of secondary coil 96, and a drain terminal. Input transistor 102 may have a source terminal coupled to ground, a gate terminal coupled to the second terminal of secondary coil 96, and a drain terminal. Second amplifier stage 60-2 may further include an output transformer having a primary coil (winding) 104 and a secondary coil (winding) 106. Primary coil 104 has a first terminal coupled to the drain terminal of input transistor 100, a second terminal coupled to the drain terminal of input transistor 102, and a center (tap) terminal coupled to second power supply switch 62-2 (e.g., a p-type metal-oxide-semiconductor or PMOS transistor). Power supply (head) transistor 62-2 may have a drain terminal coupled to coil 104, a gate terminal, and a source terminal that is coupled to positive power supply line 64. Secondary coil 106 may have terminals collectively serving as a differential output port for the LNA circuitry 52.

Envelope detection circuit 76 can have an input (e.g., a differential input port) coupled to second amplifier stage 60-2. In the example of FIG. 4, the input of envelope detection circuit 76 is coupled to the drain terminals of input transistors 100 and 102. This is illustrative. In general, envelope detector 76 can have one or more inputs coupled to another node associated with second amplifier stage 60-2. Envelope detection circuit 76 can have an output (e.g., a differential output port) on which corresponding envelope signal ENV is generated. The envelope signal ENV can be provided to an input of feedback control circuit 78.

In FIG. 4, feedback control circuit 78 is implemented as a differential-to-single-ended amplifier with an adjustable offset. This is exemplary. In other embodiments, feedback control circuit 78 can be implemented as a sense amplifier, an operational amplifier, or other differential amplifying circuit. In the example of FIG. 4, controller 78 can include input transistors 110-1 and 110-2 (e.g., PMOS transistors), current sources 112-1 and 112-2, an adjustable resistance 124, n-type transistors 114-1, 114-2, 116, and 120, and p-type transistors 118 and 122.

First input transistor 110-1 can have a gate terminal coupled to the output of envelope detector 76, a source terminal configured to receive a current from current source 112-1, and a drain terminal coupled to n-type transistor 114-1. Second input transistor 110-2 can have a gate terminal also coupled to the output of envelope detector 76, a source terminal configured to receive a current from current source 112-2, and a drain terminal coupled to n-type transistor 114-2. Adjustable resistance 124 can be coupled across the source terminals of the input transistors 110-1 and 110-2. Resistance 124 coupled to the source terminals of the input transistors is sometimes referred to as a source degeneration resistor. The value of resistance 124 can be adjusted to control a loop gain or the stability of feedback controller 78 (e.g., to control the slope of a transfer function characterizing the behavior of controller 78).

Transistor 114-1 may have a drain terminal coupled to the drain terminal of input transistor 110-1, a gate terminal shorted to its drain terminal, and a source terminal coupled to ground. Transistor 114-1 with its gate and drain terminal shorted is sometimes referred to as a "diode-connected" transistor. Transistor 116 may have a gate terminal shorted to the gate terminal of transistor 114-1, a source terminal coupled to ground, and a drain terminal coupled to diode-connected p-type transistor 118.

On the other side, transistor 114-2 may have a drain terminal coupled to the drain terminal of input transistor 110-2, a gate terminal shorted to its drain terminal, and a source terminal coupled to ground. Transistor 114-2 is thus also a diode-connected transistor. Transistor 120 may have a gate terminal shorted to the gate terminal of transistor 114-2, a source terminal coupled to ground, and a drain terminal coupled to p-type transistor 122. The gate terminal of transistor 122 may be directly coupled to the gate terminal of transistor 118. Transistor 120 may have a tunable width or drive strength for adjusting an offset value of circuit 78 implemented as a differential-to-single-ended amplifier. If desired, input transistors 110-1 and 110-2 can also have tunable widths or drive strength for adjusting the offset value of amplifier 78.

The node between transistors 120 and 122 may serve as a single-ended output port of feedback control circuit (amplifier) 78. Feedback control signal CON may be generated at the single-ended output port of circuit 78. A filter circuit such as RC filter 130 (e.g., a filter having series resistor 132 and shunt capacitor 134) can optionally be coupled at the output of feedback control circuit 78. The feedback controller output signal CON can be used to control one or more portions of the radio-frequency receiving amplifier (e.g., to adjust one or more components coupled to amplifier stages 60-1 and 60-2).

As an example, signal CON can be used to control one or more of the power supply (head) switches 62. In particular, signal CON can be fed to the gate terminals of switches 62-1 and/or 62-2 via a multiplexer 136. Multiplexer 136 can selectively pass through the analog (voltage) signal CON or a digital control signal Dsup to the gate terminals of the amplifier power supply switches. Configured in this way, signal CON can be used to weaken or turn off power supply switches 62 to reduce the gain of amplifier stages 60-1 and 60-2, which proactively lowers the signal swing for signals propagating through the receiving amplifier circuitry in response to the feedback controller 78 detecting a large envelope signal.

As another example, signal CON can be used to control mode switch 66. In particular, signal CON can be fed to the gate terminal of transmit-receive mode switch 66 via a multiplexer 138. Multiplexer 138 can selectively pass through the analog (voltage) signal CON or a digital enable signal Den. Configured in this way, signal CON can be used to turn off mode switch 66 to ground the LNA input, which proactively disables the wireless receiver in response to the feedback controller 78 detecting a large envelope signal.

As another example, signal CON can be used to control a pull-down circuit 140 that is coupled to the gate terminal of input transistor 80 via resistor 86 and/or that is coupled to the center tap terminal of secondary coil 96 via resistor 98. Pull-down circuit 140 may be an NMOS pull-down transistor. Configured in this way, signal CON can be used to selectively activate pull-down circuit 140 to pull down bias voltage Vbias_1 (e.g., to weaken or disable input transistor 80 of the first amplifier stage 60-1) and/or to pull down bias voltage Vbias_2 (e.g., to weaken or disable the second amplifier stage 60-2), which proactively reduces the gain of the first and second amplifier stages in response to feedback controller 78 detecting a large envelope signal.

As another example, signal CON can be used to control a pull-down circuit 142 that is coupled to the gate terminal of cascode transistor 82 via resistor 90. Pull-down circuit 142 may be an NMOS pull-down transistor. Configured in this way, signal CON can be used to selectively activate pull-down circuit 142 to pull down bias voltage Vbias_cas (e.g., to weaken or disable cascode transistor 82 of the first amplifier stage 60-1), which proactively reduces the gain of the first amplifier stage in response to the feedback controller 78 detecting a large envelope signal. These various techniques for adjusting the gain of amplifier stages 60-1 and 60-2 based on the value of the envelope signal ENV are not mutually exclusive and can be employed in any combination. If desired, signal CON can be used to weaken or disable any other portion of the radio-frequency receiving amplifier circuitry.

Figure 5:
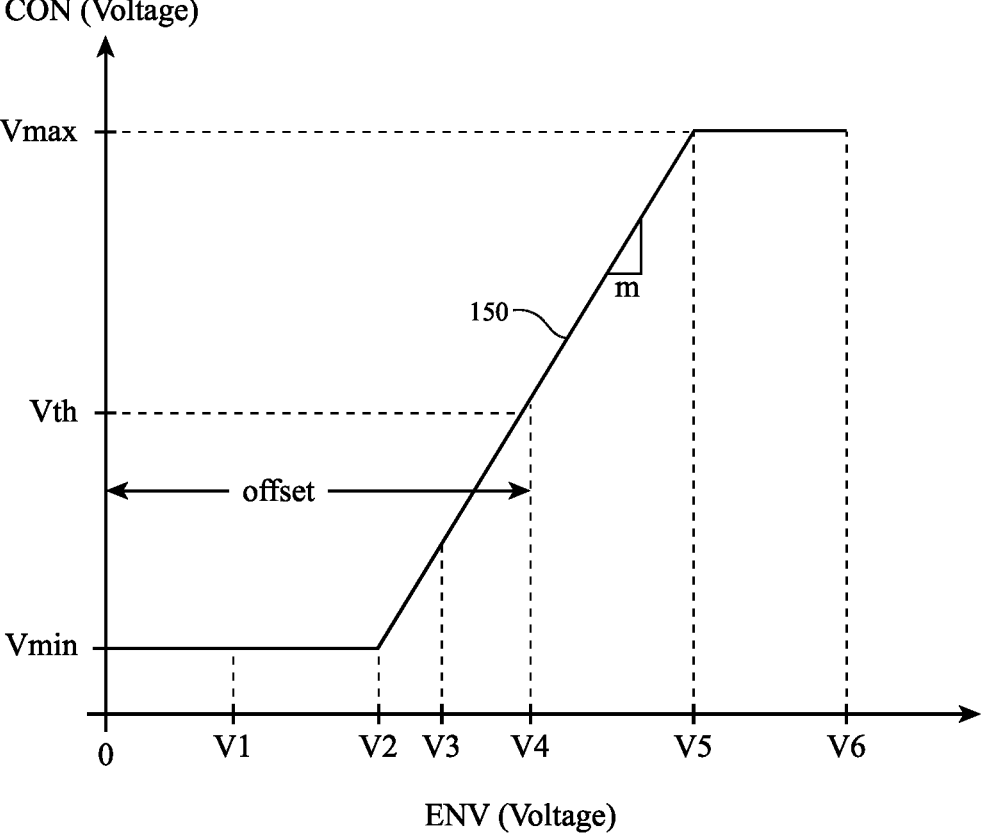
FIG. 5 is a plot of an illustrative transfer function of a feedback control circuit shown in FIGS. 3 and 4 in accordance with some embodiments.

FIG. 5 is a plot of an illustrative transfer function of feedback control circuit 78. As shown in FIG. 5, the transfer function curve 150 of feedback controller 78 is a function of the value of envelope signal ENV. Voltage V1 may represent a normal or nominal level of signal ENV output from amplifier circuitry 52. When signal ENV is near voltage V1 or below voltage V2, the feedback controller may drive signal CON to a low voltage Vmin. Voltage V3 may represent a voltage level where the automatic gain control mechanism from the digital processing kicks in.

Voltage V3 may be less than an offset voltage V4. When signal ENV is equal to voltage V4 (e.g., when detecting radio-frequency input signals at higher power levels), the feedback controller may drive signal CON to a threshold voltage Vth. The offset voltage V4 sets a threshold level that determines when the overvoltage local feedback protection loop is enabled. As described above in connection with FIG. 4, offset voltage V4 can be adjusted by tuning the width or driving strength of transistor 120 or 122. Voltage V5 may correspond to a voltage level where the feedback controller drives signal CON to a high voltage Vmax. Voltage V6 may represent the maximum envelope detector output level. In the example of FIG. 5, transfer function 150 may rise linearly as signal ENV increases from voltage V2 to V5. The linear portion of transfer function 150 has a slope m that controls the sensitivity of the feedback protection loop. As described above in connection with FIG. 4, the slope m of transfer function 150 can be adjusted by tuning resistance 124 or other load component within the feedback controller.

FIG. 6 is a flow chart of illustrative steps for operating the wireless receiver circuitry of the type described in connection with FIGS. 1-5. During the operations of block 160, the receiving amplifier (LNA) circuitry 52 can receive a radio-frequency signal from one or more antenna(s) 42 and can output a corresponding amplified radio-frequency signal. During the operations of block 162, envelope detector 76 can generate an envelope signal based on the amplified signal output from receiving amplifier circuitry 52. The envelope signal can be conveyed to a digital processor for automatic gain control or other processing and/or can be conveyed to local feedback controller 78.

During the operations of block 164, feedback controller 78 (e.g., a differential-to-single-ended amplifier or other sensing amplifier having a single-ended or differential input port and having a single-ended or differential output port) can generate a feedback control signal in accordance with a transfer function. The transfer function of feedback controller 78 can be similar to that shown in the example of FIG. 5. The transfer function of feedback controller 78 can have an adjustable offset and can have an adjustable slop.

During the operations of block 166, feedback controller 78 can generate a feedback control signal that dynamically reduces the gain of receiving amplifier circuitry 52 in response to detecting an envelope signal indicative of high signal amplitudes being received at amplifier circuitry 52 that might damage one or more circuit components in the receive path. To help mitigate or prevent damage of the components in the receive path, the feedback control signal can be used to control one or more power supply (head) switches 62 within the receiving amplifier circuitry (see FIG. 4), to control mode switch 66, to control a bias (voltage) level of an input transistor of the receiving amplifier circuitry (e.g., to control Vbias_1 being provided to input transistor 80 in first amplifier stage 60-1), to control a bias (voltage) level of a cascode transistor of the receiving amplifier circuitry (e.g., to control Vbias_cas being provided to cascode transistor 82 in first amplifier stage 60-1), to control a bias (voltage) level of an output stage of the receiving amplifier circuitry (e.g., to control V_bias2 being provided to the center tap terminal of coil 96), and/or to dynamically adjust one or more components within or associated with amplifier circuitry 52. If desired, feedback controller 78 can optionally control other component(s) along the signal reception/downlink path (e.g., to tune one or more circuits between antenna 42 and processor 26).

This local feedback loop that includes feedback controller 78 and the components that it controls can provide various benefits and technical advantages. For instance, the feedback controller 78 can offer protection from large radio-frequency signal amplitudes without introducing parasitics to the receive signal path and without any degradation to the receiver performance. The response time of local feedback loop is also much faster than the digital automatic gain control (AGC) mechanism and can further improve the robustness and lifetime of wireless circuitry 24. The behavior of the local feedback loop can be adjusted by tuning the offset (threshold) level and optionally the maximum attenuation level (e.g., to adjust the amount of signal suppression, to adjust the response time of the feedback loop, and/or to adjust the sensitivity of the feedback loop). The operation of the local (analog) feedback loop is also fully autonomous, where the feedback loop is automatically released when the high power input signal disappears or is no longer present.

The methods and operations described above in connection with FIGS. 1-6 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 and/or wireless communications circuitry 24 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry in wireless circuitry 24, processing circuitry 18 of FIG. 1, etc.). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. Wireless circuitry comprising:
an amplifier configured to receive a radio-frequency signal from one or more antennas;
a detection circuit configured to receive signals from the amplifier and configured to output a corresponding detected signal; and a feedback control circuit configured to receive the detected signal from the detection circuit and configured to output a corresponding control signal for adjusting one or more components in the wireless circuitry.

2. The wireless circuitry of claim 1, wherein the detection circuit comprises an envelope detector, a radio-frequency power detector, or an amplitude detector.

3. The wireless circuitry of claim 1, further comprising:
a variable gain amplifier coupled to an output of the amplifier;
a mixer coupled to an output of the variable gain amplifier; and
an analog-to-digital converter coupled to an output of the mixer.

4. The wireless circuitry of claim 1, wherein the feedback control circuit comprises a differential-to-single-ended amplifier.

5. The wireless circuitry of claim 1, wherein the feedback control circuit comprises a differential-to-single-ended amplifier having an adjustable offset.

6. The wireless circuitry of claim 1, wherein the feedback control circuit comprises a differential-to-single-ended amplifier exhibiting a transfer function with an adjustable slope.

7. The wireless circuitry of claim 1, further comprising a filter circuit coupled to an output of the feedback control circuit.

8. The wireless circuitry of claim 1, wherein the control signal adjusts one or more power supply switches in the amplifier.

9. The wireless circuitry of claim 1, wherein the control signal adjusts a mode switch coupled to an input of the amplifier, the mode switch being activated when the antenna is transmitting radio-frequency signals and being deactivated when the antenna is receiving radio-frequency signals.

10. The wireless circuitry of claim 1, wherein the control signal adjusts one or more bias levels in the amplifier.

11. The wireless circuitry of claim 10, wherein:
the amplifier comprises a first amplifier stage and a second amplifier stage; and
the control signal adjusts a bias level of a transformer coil disposed between the first and second amplifier stages.

12. The wireless circuitry of claim 1, further comprising one or more pull-down circuits coupled between the feedback control circuit and the amplifier.

13. The wireless circuitry of claim 1, further comprising one or more multiplexers coupled between the feedback control circuit and the amplifier.

14. A method of operating wireless circuitry, the method comprising:
with an amplifier, receiving a radio-frequency signal from one or more antennas;
generating an envelope signal based on the radio-frequency signal received at the amplifier; and
reducing a gain of the amplifier in response to detecting that the envelope signal exceeds a threshold level.

15. The method of claim 14, further comprising:
with a feedback controller, receiving the envelope signal and generating a corresponding control signal for reducing the gain of the amplifier.

16. The method of claim 15, wherein reducing the gain of the amplifier comprises adjusting one or more power supply switches of the amplifier in accordance with an amplifier transfer function with an adjustable slope or offset.

17. The method of claim 15, wherein reducing the gain of the amplifier comprises adjusting a transmit-receive mode switch in accordance with an amplifier transfer function with an adjustable slope or offset, the method further comprising:

during a transmit mode, activating the transmit-receive mode switch; and during a receive mode, deactivating the transmit-receive mode switch.

18. The method of claim 15, wherein reducing the gain of the amplifier comprises adjusting one or more bias levels of the amplifier in accordance with an amplifier transfer function with an adjustable slope or offset.

19. The method of claim 18, wherein adjusting one or more bias levels of the amplifier comprises pulling down the one or more bias levels of the amplifier.

20. Wireless circuitry comprising:

an amplifier having at least a first amplifier stage and a second amplifier stage, an input coupled to one or more antennas, and an output coupled to one or more processors;

a transmit-receive mode switch coupled to the input of the amplifier;

a detector having an input coupled to the second amplifier stage and configured to generate a detected signal; and a feedback controller configured to receive the detected signal and to generate a corresponding control signal for adjusting at least one of a first power supply switch in the first amplifier stage, a second power supply switch in the second amplifier stage, a bias level of an input transistor in the first amplifier stage, a bias level of a cascode transistor coupled in series with the input transistor in the first amplifier stage, and a bias level of a coil coupled between the first and second amplifier stages.

* * * * *